United States Patent [19]

Zelan et al.

[11] Patent Number: 5,013,109

[45] Date of Patent: May 7, 1991

[54] MODULAR SYSTEM FOR DECORATIVE LIGHTING

[75] Inventors: Donald J. Zelan, Portland, Oreg.; William G. Dubay, Sparks, Nev.

[73] Assignee: Fiber Tech, Inc., Portland, Oreg.

[21] Appl. No.: 431,927

[22] Filed: Nov. 6, 1989

[51] Int. Cl.⁵ .............................................. G02B 6/00
[52] U.S. Cl. .............................. 350/96.1; 350/96.24; 362/32
[58] Field of Search ................. 350/96.1, 96.24, 96.25, 350/96.27; 362/32

[56] References Cited

U.S. PATENT DOCUMENTS

| | | | |
|---|---|---|---|
| 3,609,343 | 9/1971 | Howlett | 362/32 |
| 3,712,724 | 1/1973 | Courtney-Pratt | 362/32 |
| 3,805,048 | 4/1974 | Brennesholtz | 350/96.24 |
| 3,836,911 | 9/1974 | Gibson et al. | 350/96.24 X |
| 4,501,084 | 2/1985 | Mori | 350/96.24 X |
| 4,738,510 | 4/1988 | Sansom | 350/96.25 |
| 4,745,525 | 5/1988 | Sheehy | 362/32 |

Primary Examiner—John D. Lee
Assistant Examiner—John Ngo
Attorney, Agent, or Firm—Robert L. Harrington

[57] ABSTRACT

A modular arrangement of a single light source providing light points to multiple panels by light transmitting fiber strands. Each panel has a pattern of drilled holes and is pre-assembled with a fiber strand secured in each hole. The fiber strands of each panel are bundled and encased into cords for ease of handling and installation of the panel. Fittings on the end of each cord attach the cord of each panel to the light source.

8 Claims, 2 Drawing Sheets

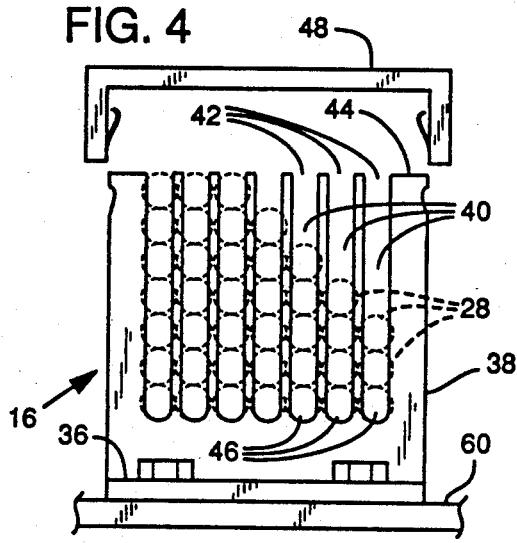
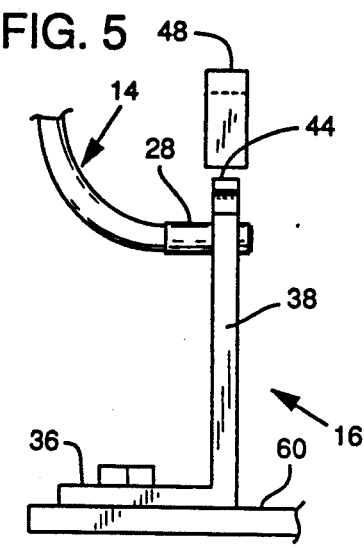
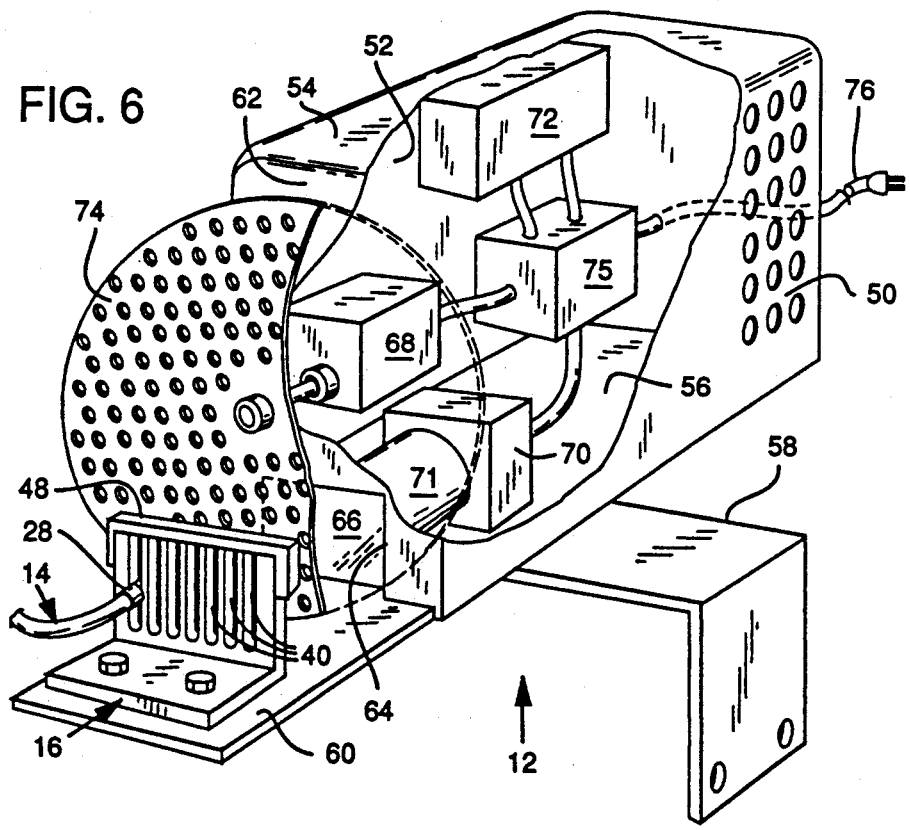

MODULAR SYSTEM FOR DECORATIVE LIGHTING

FIELD OF HE INVENTION

This invention relates to decorative lighting where light points are provided in ceiling and wall panels for decorative effect and more particularly to a prefabricated modular system to more efficiently install the decorative lighting.

BACKGROUND OF THE INVENTION

Fiber optics have added a new dimension to the use of light as decoration. One example is the provision of light points emanating from a darkened ceiling to simulate flickering stars observed in an open sky. Long flexible fiber strands are used to create light points transmitted from a single remote light source. Dozens of fiber strands can emanate from a single light source and produce dozens of light points across a series of panels mounted in a ceiling or wall. The typical problems of heat and power light generation are handled at the single light source. One light source and one system for handling heat propagated by the light source, replaces dozens of light bulbs and complex electrical circuitry of prior systems.

The present invention is directed to an improved construction for providing decorative light points utilizing fiber optics. Previously, fiber optic installers would travel to the construction site and install the light point system. For a ceiling structure, hundreds of small holes were drilled into the previously installed ceiling panels. Fiber optic strand ends were then inserted into the holes. The opposite end of the fiber strands were gathered into bundles. Light boxes were then installed at strategic positions among the ceiling rafters and the bundled fiber optic strand ends were attached to the light boxes. Light from the light boxes was directed onto the bundled fiber strand ends and the fiber strands transmitted the light to the scattered holes in the ceiling panels.

THE PRESENT INVENTION

The process described above requires skilled installers to travel to the building site wherever that may be and perform the tedious task of installation under less than desirable conditions, generally in cramped quarters among ceiling joints and rafters. The process was time consuming and tedious and consequently unduly expensive. The present invention greatly simplifies the installation process by the provision of a prefabricated modular system.

In the preferred embodiment of the invention, modules made up of a number of light point panels are constructed at the factory site. Each panel has holes drilled through corresponding to a desired pattern. One end of a fiber strand is inserted into each of the drilled holes and secured to the panel. The multiple fiber strands utilized on a single panel are bundled together and encased in a vinyl tube forming what is referred to as an umbilical cord. Its length is typically about 15 feet. A special fitting is provided to the umbilical cord end. Riser blocks or pegs are fastened to the top (or back) surface of the panel for shipping purposes. A mounting block is also fastened to the top surface of the panel for attaching the umbilical cord. For shipment, the umbilical cord is wound around two of the riser blocks or pegs.

Ideally, a light box is provided to accommodate fifty umbilical cords. Usually one umbilical cord is supplied per panel, therefore one light box will provide light points for up to fifty panels. A fixture designed to securely hold 50 of the umbilical cord fittings in the direct path of the light beam is mounted to the light box. The light box has a special effects disk that rotates through the light beam between the fixture and the light source to produce e.g. a flickering effect. A tinted transparent plate covers an opening in an end wall of the light box placing it in the path of the light beam. The tint provides the illusion of looking at the same 'color' light as the stars. The plate is a heat barrier and it shields the ends of the fiber strands from the heat generated in the light box. This plate or another plate may be colored to produce colored light. The special effects disk may also be colored or it may have multiple colors so the light points will change in color as the disc rotates through the light beam.

The prefabricated panel and light box devices are simply shipped to the job site and ceiling panel installers install the panels. In some cases the panels need to be installed in a designated pattern but instructions can be provided using a numbering system or the like that would not require any special skills. Once the panels are installed, the light box devices are mounted, generally to the ceiling rafters, e.g. by mounting brackets provided on the devices. One of the light box devices is provided for each 50 panels. The umbilical cords are unwrapped and the fittings on the cord ends are attached to the fixture of the designated light box device. In some instances the fittings must be specially arranged in the fixture to accommodate the desired decorative lighting pattern and again a numbering system and written instructions will enable the panel installer to accomplish this task.

The above concept is generally referred to herein as a modular system of light point installation. The tedious job of drilling holes and attaching fiber strands in the holes as by gluing, all takes place at the factory. Mounting the prepared panels and light box devices to a ceiling and plugging umbilical cord fittings from the panels into the light box device is all the panel installer is required to do.

The invention will be more fully appreciated upon reference to the following detailed description of a preferred embodiment and including the accompanying drawings.

DESCRIPTION OF THE DRAWINGS

FIG. 4 and FIG. 5 are two views of the fixture that hold the ends of the umbilical cord.

FIG. 6 is a cut-away view of the light source housing.

DESCRIPTION OF THE PREFERRED EMBODIMENT

Figure 1:
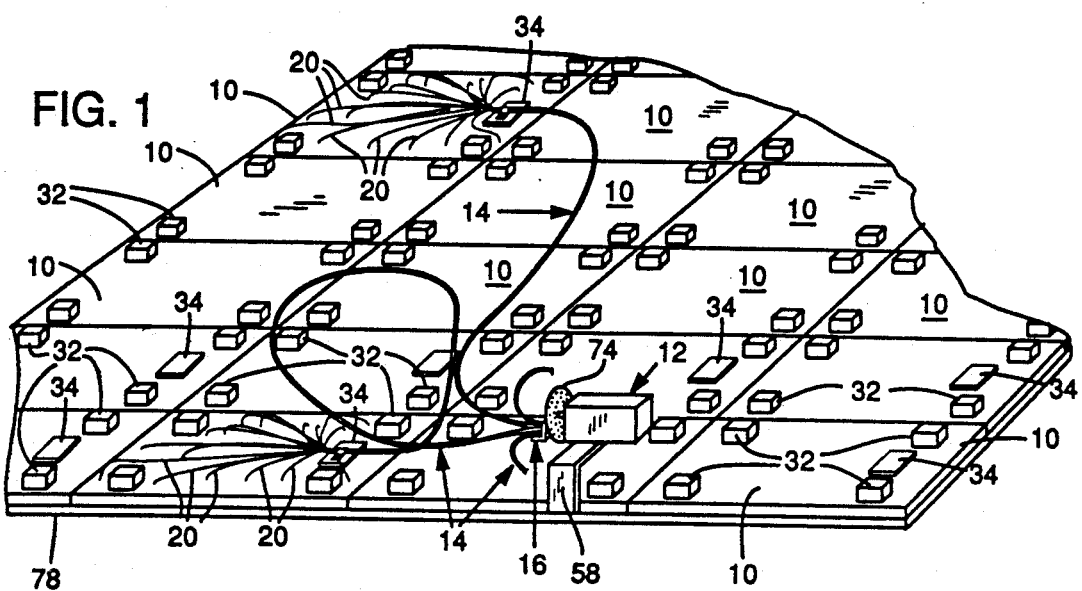
FIG. 1 is a view of a partial installation of decorative panels and a light source housing installed on the ceiling framework.

In reference to FIG. 1, a partial installation of decorative light point ceiling panels 10 and a light source housing 12 on a framework 78 (rails) as used in a drop or hung ceiling is illustrated. Besides being decorative the panels 10 most often have acoustical and insulating qualities. To enhance the decor, such as in a lounge or restaurant, the panels are provided with a pattern of light points.

The light points are provided by light transmitting fiber strands 20 inserted and secured into holes drilled in the panels 10. The fiber strands 20 transmit light from the light source 12 through the holes 31 in the panel 10 and are viewed as light points from the under side of the panels 10.

To simplify and greatly reduce the cost of the installation, the fiber strands 20 are pre-assembled on the panels 10 at the factory. Multiple holes 31 are drilled into each of the panels 10 and a fiber strand 20 is inserted and secured in each of the drilled holes 28.

Figure 2:
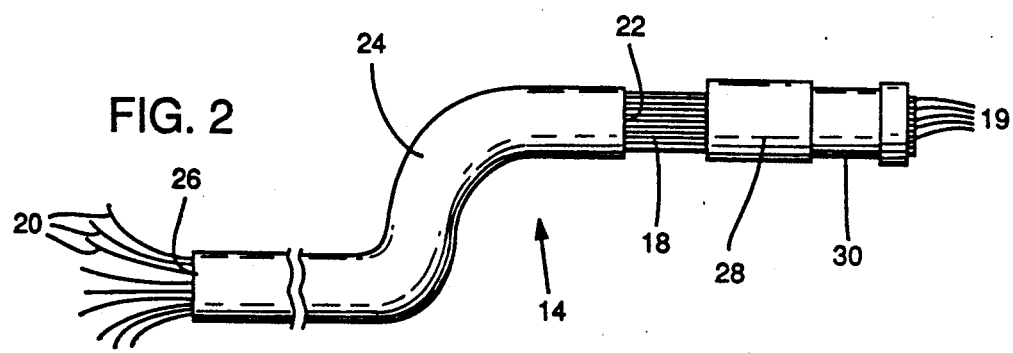
FIG. 2 is a drawing of an umbilical cord.

For ease of packaging, handling and installation, the multiple fiber strands 20 installed on each panel 10 are bundled and encased in a vinyl sleeve 24 with the loose ends of the fiber strands 20 installed in a cylindrical fitting 28 forming an umbilical cord 14 (as shown in FIG. 2). The fitting 28 will attach the end of the umbilical cord 14 to a fixture 16 (FIG. 4 & 5) on the light source housing 12 and position the ends of the fiber strands (installed in the fitting) in the path of a light beam of the light source housing 12. The light is thus transmitted from the light source housing through the fiber strands 20 to provide a visual light point on the panel 10. Riser or spacer blocks 32 are affixed near each corner of the panel 10 to provide the necessary space for packaging the umbilical cord 14 and to protect the fiber strands 20 that are inserted and secured in the drilled holes 31 of the panel 10.

The light source housing 12 as previously stated is mounted on the framework 78 (rails) that supports the panels 10 and includes a fixture 16 for attaching the umbilical cords 14, a low voltage light source, and a motorized rotating perforated wheel 74 that intermittently interrupts the light beam which adds a flickering effect to each light point. A color wheel or a wheel with multiple colors is also often added for visual effect. The fixture 16 on the light source housing 12 will accommodate up to fifty umbilical cords 14 and therefore provides illumination of the light points on fifty panels 10.

A further detailed description of the umbilical cord 14, the panel 10, the fixture 16, and the light source housing 12 follows.

UMBILICAL CORD

An umbilical cord 14 is as illustrated in FIG. 2. The cord is a bundle 18 of light transmitting fiber strands 20 encased in a vinyl sleeve 24 having defined ends 22 and 26 with the bundle 18 of fiber strands 20 extending beyond both ends 22 and 26 of the sleeve 24. In this embodiment, there are twenty five fiber strands 20 in the bundle 18. However, the number of fiber strands 20 in a bundle 18 may vary with the application, the diameter of the fiber strand 20 being a controlling factor. The end of the bundle 18 extending beyond end 22 of the sleeve 24 is inserted into a configured cylindrical fitting 28 with the ends 19 of the fiber strands 20 extending through and just beyond the end of fitting 28. The end 22 of the sleeve 24 that encases the bundle 18 is in close proximity to or even in abutment with the fitting 28. Glue is applied to retain the bundle 18 in the fitting 28. The fiber strand ends 19 of the bundle 18 are then trimmed flush with the end of the fitting 28 (although shown slightly protruded for purposes of illustration). The fitting 28 has an external annular groove 30 formed on its periphery. With reference to FIGS. 1, 4, 5, & 6, it will be seen that the groove 30 will fit slidably in a slot 40 of the holding fixture 16 mounted on a bracket plate 60 of the light source housing 12.

PANEL

Figure 3:
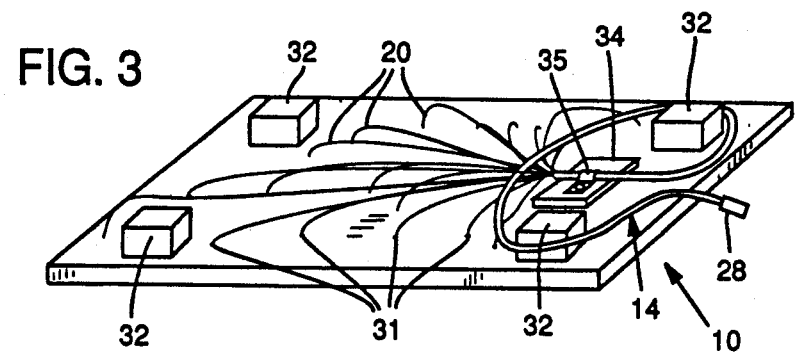
FIG. 3 is a drawing of a modular panel.

A panel 10 is more specifically illustrated in FIG. 3. The panel 10 has riser blocks (pegs) 32 glued to the top or back surface and are generally positioned at each of the four corners as illustrated. A mounting block 34 is also glued to the top surface and is usually positioned between two of the riser blocks 32 near one end of the panel 10. The umbilical cord 14 is attached to the block 34 by a clamp 35. The cord 14 is clamped to the block 34 at the end 26 of the sleeve 24. The length of the fiber strands 20 extending beyond the clamped end 26 of the sleeve 24 are of sufficient length to be inserted into any hole 31 regardless of the location of the hole 31 on that panel 10. As illustrated in FIG. 3, the riser blocks 32 and mounting block 34 are in known positions. The riser blocks 32 and mounting block 34 can be attached in differing positions on the panel 10 to avoid conflict with any hole or holes 31 that are drilled to complete a pattern.

Holes 31 are drilled in the panel 10 from the bottom surface through to the top surface. The bottom surface of the panel 10 is the surface that will be exposed to view after the panels are installed in the ceiling framework 78 (rails). The hole pattern for the holes 31 may be a random selection or they may be to a specific pattern. An individual fiber strand 20 is inserted into each hole 31 from the top surface of the panel with the fiber strand 20 extending through the hole 31 and extending just beyond or flush with the bottom surface of the panel 10. Each fiber strand 20 is retained in its hole 31 by gluing.

The purpose of the riser blocks (pegs) 32 is for packaging the panel 10 for shipment and also for stacking one on top of another during installation or repair. They provide a free space for the umbilical cord 14, and protect the fiber strands 20 that extend beyond the end 26 of the sleeve 24 of the cord 14 which have been glued into position in drilled holes 31. The umbilical cord 14 is wound around the two riser blocks 32 closest to the mounting block 34 in the packaging process.

FIXTURE

A fixture 16 is illustrated in FIGS. 4 and 5. The fixture 16 is 'L' shaped and has a horizontal leg 36 and a vertical leg 38. The horizontal leg 36 has drilled holes to facilitate fastening the fixture 16 to the bracket plate 60 of the light source housing 12. The vertical leg 38 has parallel elongated formed slots 40 with each slot having an open end 42. The open end 42 of the slots 40 being at the top edge 44 of the vertical leg 38. The slots 40 extend from the top edge 44 of the vertical leg 38 downward toward and terminate with the closed end 46 of the slots 40 in close proximity to the intersection or juncture of the vertical leg 38 with the horizontal leg 36. The closed ends 46 of the slots 40 are radiused to correspond to the base radius of the annular groove 30 of the fitting 28. The width of the slots 40 are dimensioned to closely correspond to the base diameter of the annular groove 30 of the fitting 28. The thickness of the vertical leg 38 corresponds to the length of the groove 30. The fittings 28 of the umbilical cord 14 are thus slidably installable in the slots 40 of the fixture 16. A holddown clamp 48 fits over the top edge 44 of the vertical leg 38 to retain the fittings 28 in the slots 40 of the fixture 16.

LIGHT SOURCE

A light source housing 12 is illustrated in FIG. 6. The housing 12 is basically in the shape of a rectangular box having one end open and is preferably constructed of a light weight material such as aluminum. The side walls 50, 52, and the top wall 54 of the housing 12 have perforations to permit the free passage of air. The air flow will dissipate the heat generated within the housing by the motor, transformer and the light bulb 71 of the light fixture 70. Affixed to the bottom wall 56 are the mounting stand 58 and bracket plate 60. The mounting stand 58 is positioned near the midpoint of the bottom wall 56 with the stand extending outwardly from each side edge of the bottom wall 56. The stand 58 is configured to be demountably attached to a ceiling panel support structure (rails) that support the panels 10 when installed. The bracket plate 60 extends from the end of the bottom wall 56 at the closed end of the housing 12. The bracket plate 60 has drilled holes to accept the mounting of the fixture 16 to the plate 60 by suitable fasteners. While it has been suggested that the fixture 16 be attached to the bracket plate 60 by fasteners, other methods may be employed. The alignment of the fixture with the projected light beam is the important factor to consider. Also, the fixture and bracket plate may be of single unit construction.

The closed end of the housing 12 has an end wall 62. The lower portion of end wall 62 near the bottom wall 56 has an opening 64 as illustrated in FIG. 6. The opening 64 is covered by a protective heat shielding glass plate 66. Installed within the housing 12 is a motor 68, a light fixture 70, and a transformer 72. The motor 68 is mounted on the end wall 62 with the shaft of the motor extending through the end wall 62. Mounted on the end of the shaft of the motor 68 is a wheel 74. As shown in FIG. 6, a portion of the wheel is between the light fixture 70 and the fixture 16. The wheel 74 is an opaque cylindrical disc that has geometric perforations, the geometric perforations permitting the passage of the light beam through the wheel. The light fixture 70 is fastened to the bottom wall 56 and is positioned so the projected light beam from the bulb 71 of the light fixture 70 will pass through the opening 64 in the end wall 62, through the geometric perforations of the wheel 74 and will impinge on the ends of the fiber strands 20.

The transformer 72 is mounted to one of the side walls within the housing 12. The transformer 72 supplies reduced voltage to the bulb 71 of the light fixture 70. An electrical terminal box 75 is also installed within the housing 12 for the wiring connection of the electrical supply with the motor and the transformer and the connection between the output of the transformer and the light fixture. An electrical cord 76 is provided for connection to a standard 115 volt, 60 hz. outlet.

INSTALLATION

As illustrated in FIG. 1, the pre-assembly of the umbilical cord 14 onto the panel 10 and the securing of the fiber strands 20 into the drilled holes 31 greatly simplifies the installation of the decorative light point panels 10 at the designated site. The light source housing 12 is installed on the framework 78 (rails) of the ceiling panel support structure and connected to an electrical supply. The panels 10 are merely placed in position on the rails of the ceiling structure, and the fittings 28 of the umbilical cords 14 are inserted into the slots 40 of the fixture 16.

This is in contrast with methods of the past where the installers, at the job site, had the time consuming task of drilling the multitude of holes in the panels, then tediously measuring, cutting, inserting and securing the fiber strand ends into the holes of each panel and finally gathering the loose ends of the fiber strands of each panel in some fashion, and mounting the gathered ends on a light source.

Those skilled in the art will recognize that the invention has many other applications and that variations and modifications may be made without deviating from the scope of the invention. The invention is therefore not to be limited to the description and drawings set forth but is to be according to the appended claims.

What is claimed is:

1. A preassembled panel to be further assembled together with multiple similar panels in side-by-side relation to cooperatively provide a ceiling or wall structure displaying an array of light points, said pre-assembled panel comprising;

a panel member having a back side and a front side and provided with multiple holes, light transmitting fiber strands projected through the holes from the back side with their projected ends substantially flush with the front side of the panel for front side viewing of light transmitted through the fiber strands, the strands having substantial length and extending out of the holes from the back side and gathered into a common elongate bundle of fiber strands, the elongate bundle being flexible and having a substantial length as required for the gathering together of multiple bundles from multiple of the panels in the further assembly process, the fiber strands of the elongate bundle all terminating at a common end position, a fitting surrounded and capturing the end of the bundle, said fitting provided with means for mounting the bundle end into a designated fixture adapted to receive multiple fittings of multiple fiber bundles for common exposure of the multiple bundle ends to a light source.

2. A pre-assembled panel as defined in claim 1 wherein riser blocks are strategically mounted to the back side of the panel to permit stacking of multiple pre-assembled panels one on top of the other for handling during storing, shipping and assembling without crimping the fibers protruded out of the holes in the back side of the panels.

3. A pre-assembled panel as defined in claim 2 wherein a mounting block is affixed to the back side of the panel as a gathering point whereat the individual fibers are gathered together into a bundle, the bundle being clamped into the mounting block to secure the fibers against inadvertent removal from the holes during handling prior to said further assembly.

4. A ceiling or wall structure comprised of an assembled array of multiple panels laterally extended in side-by-side relation, said panels being pre-assembled as defined in claim 1, a light source projecting a light beam along a path of projection, said light source mounted at the back side of the assembled panels and accessible to the fittings of the multiple bundles of said multiple panels, a fixture having a holder compatible with the multiple fittings for mounting of the fittings and thereby the fiber ends of the multiple panel bundles, said fixture mounted relative to the light source to place the multiple fittings mounted in the fixture within the path of light projection for exposing all of the fiber ends to the light source.

5. A combination as defined in claim 4 wherein a shielding transparent plate is mounted in the path of the beam between the bulb and the fixture.

6. A combination as defined in claim 5 wherein a rotating disk having defined areas of transparency and opaqueness, is rotatably mounted between said light source and said fixture to induce a flickering effect of the light beam impinged on the fiber strand ends.

7. A combination as defined in claim 6 wherein light coloring means are positioned between the light source and the fixture to induce a colored light effect of the light beam impinged on the fiber strand ends.

8. A method of constructing a decorative ceiling or wall which comprises;
- mounting a plurality of panels that have been pre-assembled in accordance with claim 1, into an array of panels in side-by-side relation,
- mounting a light source at the back side of said panels to e accessible to the fittings of the plurality of fiber bundles of the plurality of pre-assembled panels,
- securing the plurality of fittings to a common fixture, and
- mounting the fixture relative to said light source to expose the fiber ends of said bundles to a projected light beam projected from said light source.

* * * * *